Nov. 24, 1931.  E. W. MILLER  1,833,255
THREAD GENERATING CUTTER
Original Filed July 14, 1928  2 Sheets-Sheet 2
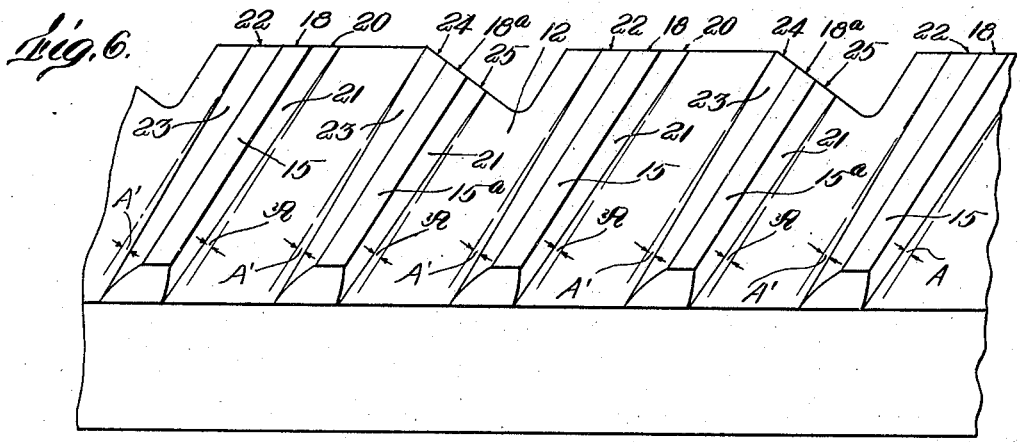
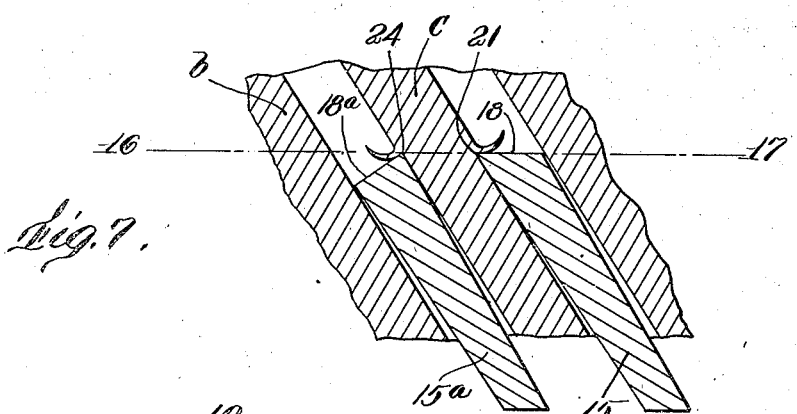
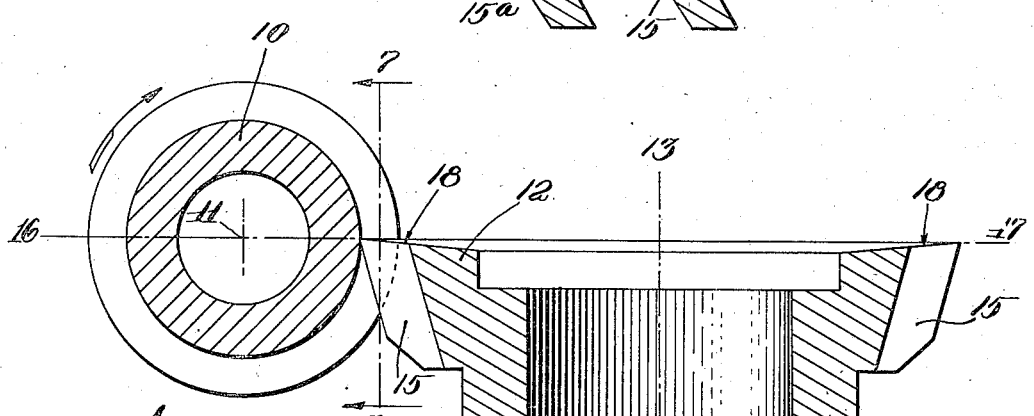
Inventor
Edward W. Miller Patented Nov. 24, 1931

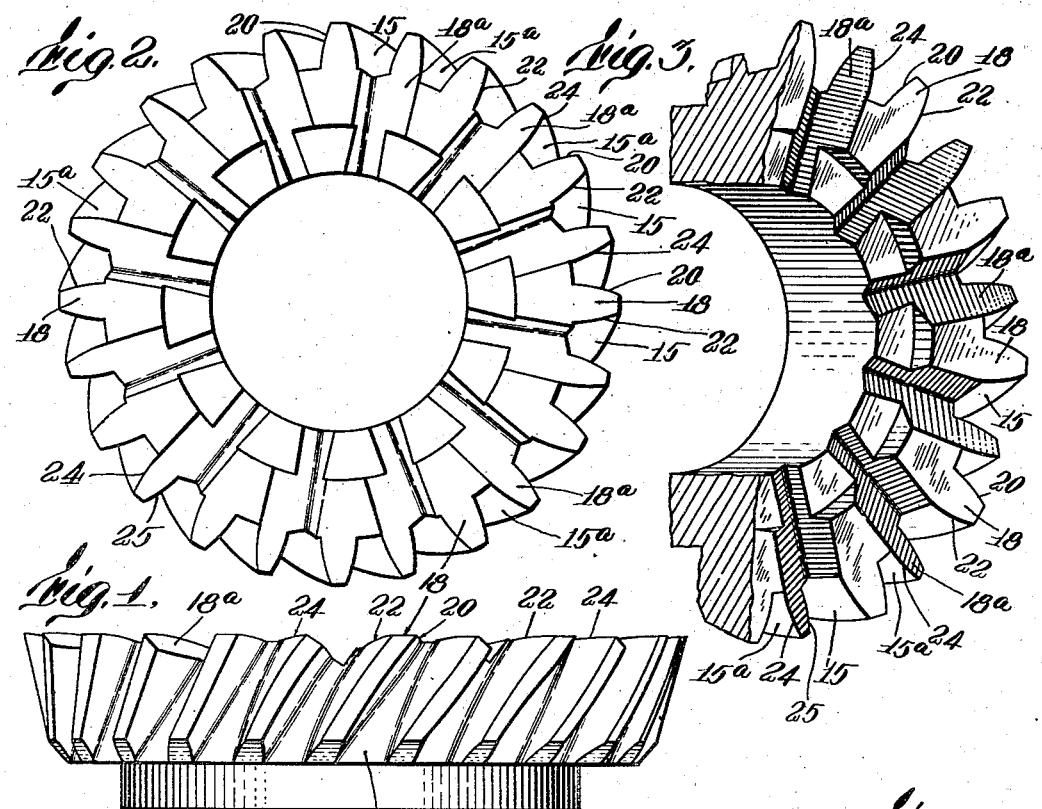
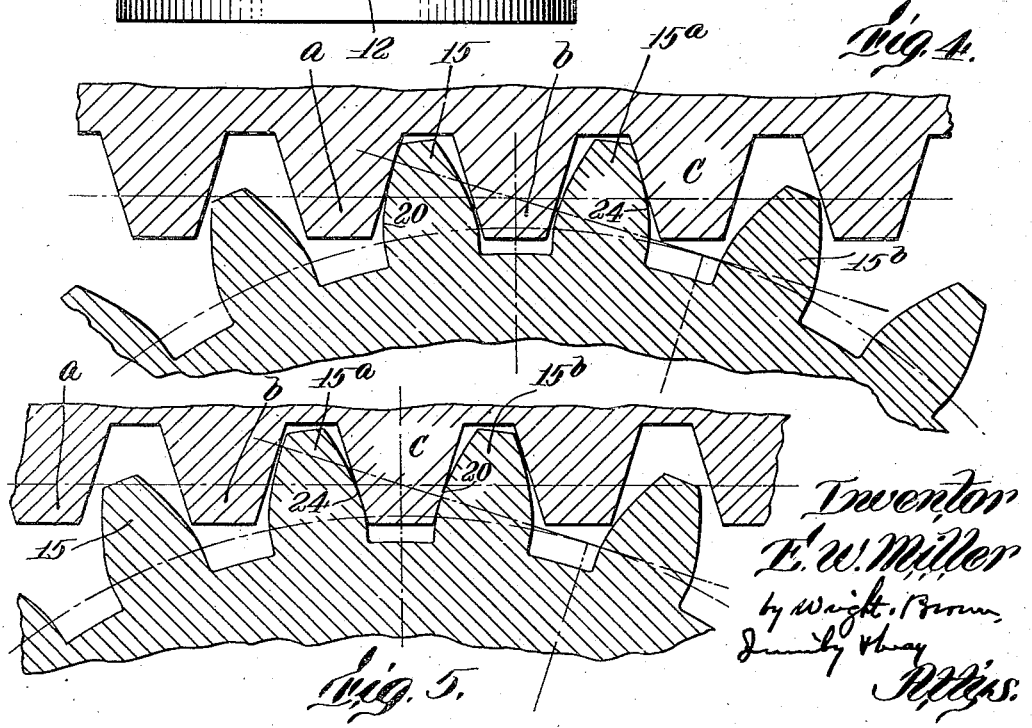

1,833,255

UNITED STATES PATENT OFFICE

EDWARD W. MILLER, OF SPRINGFIELD, VERMONT, ASSIGNOR TO THE FELLOWS GEAR SHAPER COMPANY, OF SPRINGFIELD, VERMONT, A CORPORATION OF VERMONT

THREAD GENERATING CUTTER

Application filed July 14, 1928, Serial No. 292,871. Renewed October 16, 1931.

The present invention relates to cutters designed primarily for generating threads in a form conjugate to the teeth of the gear or worm wheel with which such threads are intended to cooperate in use. The threaded articles for which, in the making, cutters of the type of my invention are used, are machine elements, usually having multiple threads, such as worms, etc.; in general, elements in which the threads are intended to cooperate with conjugate gears or the like and in which it is important that the profile of the thread have a certain form analogous to that of a rack tooth designed to mesh with a gear element. It is within my contemplation also to apply such cutters to the generation of helical gears, using a cutter of which the number of teeth is prime to the number of teeth in the gear. The cutters used for generating such threads have teeth analogous to the teeth of a gear conjugate to the work piece but with modifications adapting them to serve as metal cutting instruments and to be sharpened and used after repeated sharpenings. This type of cutter is not new, and indeed one of the type is shown in connection with a thread generating machine in my prior Patent No. 1,461,219, dated July 10, 1923, to which reference is directed for further explanation. The new step of this invention is an improvement in cutters of the type thus indicated by which certain well recognized defects of the old cutters of this type have been corrected. The principles and advantages of my new step may best be understood and appreciated in the light of a brief description of the cutters previously used.

The teeth of such cutters are themselves helical comformably to the helix of the threads to be cut, in order to clear the sides of such threads, and are provided with cutting edges on one end formed originally, and afterwards maintained in sharp condition, by grinding away the ends of the teeth approximately in a plane perpendicular to the axis of the cutter. Actually the end faces are ground at a slight inclination to such perpendicular plane in order to give the teeth the top rake which is necessary to obtain the best cutting effect; but as the deviation of the angle of top rake from the plane perpendicular to the axis is small and causes no appreciable error in the generated thread forms, it may be disregarded for the purposes of this explanation.

The sharpening of all the cutter teeth in such a plane has the serious objection that it leaves the angle between one side of the tooth and the end face obtuse, wherefore the intermediate edge has poor cutting qualities. With cutters designed for threads of the steeper pitches, the helix angle of the teeth is correspondingly larger and the efficiency of the edge at the obtuse angle correspondingly less than with cutters of less helix angle. The opposite edge, that of the acute angle of the tooth, however, is highly efficient and requires only relatively infrequent sharpening in order to maintain it in good cutting condition.

The best method heretofore known for overcoming this highly unsatisfactory condition has been to grind a notch in the end of each tooth adjacent to the obtuse side with one face of the notch at a slightly acute angle to this side; but this practice has not been wholly satisfactory because such notches can be cut only by the corner of a grinding wheel between its circumferential face and an end face, and it is difficult to keep such corner sufficiently sharp. The corner breaks away rapidly and unless the wheel is carefully watched and frequently trued, it will quickly wear away so much as to make the notch cut by it a rounded groove intersecting the side of the tooth at an obtuse angle instead of the desired acute angle. This difficulty is particularly marked with cutters having small teeth, and is so great as to become a very serious obstacle to the maintenance and use of such cutters.

According to the present invention I have overcome the difficulties above noted by grinding the end faces of certain teeth all the way across in planes approximately normal to the helix angle of these teeth, but sufficiently inclined to the helix angle to give the desired degree of top rake both from point to root of the tooth and also with the obtuse angle side of the tooth; which planes also intersect said obtuse angle sides approximately or substantially in the end plane of the cutter. In this way I provide on adjacent sides of adjacent teeth of the cutter (that is, the bounding edges of each alternate tooth space) cutting edges capable of efficiently cutting the opposite sides of the same thread being formed in the work. The invention consists in the cutter having the novel features above named, and others relating thereto and more particularly pointed out in the following specification and claims.

Having occasion in this specification to refer to one of the sides of the cutter tooth as the obtuse side or face, I will define at this point the meaning of "obtuse" as so used. The obtuse side or face of the tooth is that which makes an obtuse angle with any plane perpendicular to the axis of the cutter at that side of the face on which the substance of the tooth lies. While of course each side face of the tooth, considered only as a surface regardless of the body of the tooth, makes an acute angle on one side and an obtuse angle on the other side with planes perpendicular to the axis, I am considering as the obtuse angle side for the purposes of this specification only that side which, when produced to the cutting end and intersected by the plane at the end of the cutter perpendicular to its axis, bounds the tooth on an obtuse angle. Conversely, the acute angle side of the tooth is the side which, extended and intersected by the end plane, bounds the corner of the tooth in an acute angle. I shall use these terms with reference not only to those teeth of the cutter which are actually bounded on the end by the end plane of the cutter, but also as to those teeth which are modified according to the present invention by being truncated at their ends on inclined planes.

In the drawings furnished herewith I have shown a cutter embodying the principles of this invention designed for cutting threads of multiple lead, and therein,—

Fig. 1 is an elevation of the cutter;

Fig. 2 is an end view or plan of the cutter shown in Fig. 1;

Fig. 3 is a perspective plan view of a part of the cutter;

Figs. 4 and 5 are fragmentary sectional views illustrating successive stages in the action of the cutter in finishing the generated threads;

Fig. 6 is a development view in elevation of a part of the cutter, representing the teeth as though unwrapped from the base cylinder and laid in a plane;

Fig. 7 is a fragmentary diagrammatic cross section illustrating the cutting action of the tool, being taken on line 7—7 of Fig. 8;

Fig. 8 is a sectional view of the work piece and tool in cooperative relation, taken on a plane perpendicular to the axis of the work and including the axis of the tool.

Like reference characters designate the same parts wherever they occur in all the figures.

Reference is first directed to Fig. 8 for explanation of the principles according to which thread generating cutters of the type of my improved tool operate. 10 represents the work piece adapted to rotate about its axis 11 in the direction of the arrow; and 12 represents the cutter arranged to rotate about its axis 13, 14, and having teeth 15. The necessities of accurate and symmetrical thread generation demand that the cutting edges lie and operate as nearly as may be in a plane radial to the axis. The line 16, 17 represents such a plane. The cutter is arranged with its axis 13, 14 perpendicular to this plane and the end faces of its teeth are all ground so that at least one edge is approximately or substantially in this plane. 18 represents the end faces of the teeth 15, which are shown as diverging from the plane 16, 17, sufficiently to form the desired top rake in the radial direction. In operation the work and cutter are both rotated about their axes, and in addition there is a relative movement of translation between them in the direction of the axis of the work. The speed of rotation of the cutter is determined by two components, one being the speed complemental to that of the work, considered as a worm and gear couple, and the other being that of a gear rolling in mesh with a rack at the translative speed of the cutting travel. The second component is much smaller than the first owing to the fact that the feeding travel is relatively slow. It is good practice to provide for a feeding travel of about .002" during each rotation of the work.

In my improved cutter the teeth 15 having the end faces 18 alternate with teeth 15a having end faces 18a. All the teeth are alike except in the character of their end faces. The end faces 18 are ground and sharpened in approximately the plane 16, 17, but with such deviation as required for the radial top rake previously mentioned. Each forms a sharp edge 20 at the intersection with the acute angle side face 21, and an obtuse edge 22 at the intersection with the obtuse angle side face 23. The acute angle provides top rake tangentially of the cutter.

The end faces 18a of teeth 15a on the other hand are nearly normal to the helix angle or helical length of the teeth, but enough inclined thereto to make an acute angle, giving a desired degree of tangential top rake at the edge 24 with the face 23 of the tooth, which corresponds with the face 23 of tooth 15, and is the obtuse angle side of tooth 15a within the meaning of the definition previously given. That is, this face would make an obtuse angle with the end plane of the cutter if produced to such plane, but as the tooth is truncated, it actually makes an acute angle with the face 18a. This face is further so located that the edge 24 is approximately in the end plane of the cutter, that is, the plane represented by the line 16, 17, Fig. 8, and its deviation from such plane is too slight to cause any appreciable error in the surface which it generates in the work. Also the face 18a is so inclined as to form a top rake inwardly from the point of the tooth of an amount substantially equal to the top rake of the teeth 15. The face 18a is continued entirely across the tooth 15a and part way across the adjoining tooth space, forming an edge 25 at its intersection with the side face 21 which is slightly obtuse. It is also somewhat below the end plane of the cutter, and on this account is less efficient as a cutting edge and less accurate as a generating medium than the edges 20 and 24.

The result is that each tooth has one excellent cutting edge and one less efficient edge; but these edges are on relatively opposite sides, wherefore each alternate space is bounded by two good edges lying substantially in the cutting plane. The latter edges therefore have the greatest possible accuracy and efficiency, and they perform the final stages of cutting the threads to finished form and dimensions.

In other respects the cutter teeth may be like those of the cutters heretofore made for this class of work. The side faces of the teeth are usually involute curves generated by known methods in such fashion that the intersections of such faces with all planes perpendicular to the axis of the cutter are involutes of the same base circle. These side faces moreover are preferably formed with helix angles A and A', (indicated in Fig. 6), additional to the helix angle of the tooth as a whole in order to provide side clearance in cutting. The peripheral edges at the extremities or points of the teeth are adapted to cut and finish the bottoms of the helical grooves between the threads generated in the work.

The action of the cutter in the final stages is shown in Figs. 4 and 5, where the cutter teeth are represented in a conventional way, and not as they actually appear in end view. But their respective efficient and less efficient edges are designated by the same reference characters as previously used. It is apparent from these figures, and also from Figure 7, that the cutting is done, at least in the final stages, when the threads have been brought nearly to finished form and dimensions, by the efficient edges 20 and 24 exclusively, and that the relatively opposite edges 22 and 23 clear the work. This is accomplished by the dimensions of the cutter teeth, and is important, since rubbing of the obtuse angled edges on the work would tend to break down and score the contiguous wall of the thread by scraping off fine chips and crowding them against said wall. In Fig. 4, two of the cutter teeth are shown in cutting position. One of the teeth 15 has its acute edge 20 in cutting action on the right hand side of a thread a of the work piece, and the next following tooth 15a has its edge 24 in cutting action on the second following thread c of the work piece. The intermediate thread b, having already been reduced by previous cutting may be entirely out of contact with the cutter teeth. Assuming that the rotation of the cutter is lefthand, then its movement angularly through the angle of one tooth (15° in the case of a 24 tooth cutter) accompanied by a corresponding rotation of the work, brings the tooth 15a into the position previously occupied by the tooth 15, and the following tooth, which may here be distinguished by the numeral 15b, although it is identical in character with the tooth 15, occupies the position previously held by 15a. The thread b meanwhile advances to the position formerly occupied by a, and c advances to the position previously occupied by b, and becomes engaged upon both faces at once by the flanking acute angle edges 24 and 20 of teeth 15a and 15b.

This action goes on continuously, each alternate thread being engaged first on its advancing side by the acute angle edge of one cutter tooth and then engaged on its opposite side by the acute angle edge of the next following cutter tooth. Each thread remains in contact with the same cutter tooth throughout the arc of action of the latter, and on each following rotation of the work comes into engagement with a tooth following that with which it was previously engaged.

In order that all the threads may be equally acted on by the finish-cutting edges the number of teeth of the cutter is made prime to, that is indivisible by, the number of threads in the work. Thus if the work has two threads, the cutter must have an odd number of teeth, if the thread is triple, the number must be not divisible by three, and so on. In these drawings, a 24 tooth cutter is shown suited to generate a worm of five threads. Thus with each repeated rotation of the cutter the threads which previously passed between obtuse angle edges come into action with the efficient acute angle edges of the cutter. In the case of a cutter having an odd number of teeth, two adjacent teeth at one location must be alike, and these may be made either like the tooth 15 or like the tooth 15a. All the other teeth, however, have the alternation between those which are faced on the end in a plane substantially perpendicular to the cutter axis, and those faced in planes approximately perpendicular to their helix angle. This condition therefore may be considered as a general condition not denied by the exception just noted in regard to cutters having an odd number of teeth.

In sharpening the cutter all of the teeth 15 are ground on the ends by rotation of the cutter about its axis in contact with the circumference of a grinding wheel according to the practice previously followed. The ends of the teeth 15a are then ground by tilting the cutter at the prescribed inclination with respect to a grinding wheel and producing a radial traverse between the cutter and grinder, with indexing of the cutter after each tooth has been sharpened. If desired, however, the teeth 15 may be sharpened in the same manner as teeth 15a, in planes at any desired inclination to their helix angle. That is, if the acute angle between the face 21 of teeth 15 and the end plane of the cutter is too small or too large for the best cutting action in any case, the correct angle is obtained by locating these teeth, one at a time, at the given angle to the face of a grinding wheel and effecting relative traverse between the grinder and cutter radially of the cutter, as described with respect to the teeth 15a. The teeth of both categories, 15 and 15a, may be given thereby the same top rake, tangentially and radially of the cutter, or any other degrees of top rake, whatever their helix angle may be.

Important advantages result from thus sharpening or truncating the alternate teeth 15a, including time economy and practical assurance of satisfactory results. Time economy follows from the fact that the sharpening operator can more quickly and easily grind the faces 18a of alternate teeth, which extend all the way across such tooth and part way across the adjacent spaces, than grind narrow notches in each tooth extending across only half the width of the tooth, for a cutter of any given size and pitch. The grinding wheel requires less careful watching to be sure that its corner is not too much rounded over, and requires less frequent truing to keep it in satisfactory condition. Better assurance of satisfactory edges follows from the fact that there is no liability of the grinding wheel becoming so badly rounded on the corner that it would not form each edge 24 with an acute angle, for the rounding of the edge to cause such a failure would necessarily be of large radius and impossible to escape detection. A moderate rounding of the corner would do no harm.

It is to be understood that the foregoing explanation of the purposes and uses to which my improved cutter are put is not a limitation of the scope in which I claim protection. On the contrary, I claim a cutter having the characteristics herein described for whatever purpose it may be adapted and used, whether now known to me or which may be later devised.

What I claim and desire to secure by Letters Patent is:

1. A circular cutter of the character herein set forth having a peripheral series of helical teeth of which every alternate tooth is faced off on the end approximately in a plane perpendicular to the axis of the cutter, and the intermediate teeth are faced off in planes approximately normal to their helix angles.

2. A circular cutter having a peripheral series of helical teeth with cutting edges defined by the intersections of their end faces with their side faces, the end face of one tooth making an obtuse angle with one side face and an acute angle with the other side face, and the next tooth having an acute angle edge at the side adjacent to the acute angle of the first named tooth and substantially in the same plane therewith perpendicular to the axis of the cutter; the opposite edge of the last named tooth being in a different plane.

3. A circular cutter having a peripheral series of helical teeth with cutting edges formed by the intersections of their end faces with their side faces, certain ones of which are truncated entirely across their ends in planes approximately normal to their helix angle, and others terminate approximately in a plane perpendicular to the axis of the cutter.

4. A circular cutter having a peripheral series of helical teeth with cutting edges formed by the intersections of their end faces with their side faces; certain of said end faces being approximately perpendicular throughout their entire width to the helical length of their respective teeth but so inclined as to make an acute angle with the obtuse angle side of such tooth, and others being approximately perpendicular to the axis of the cutter.

5. A circular generating cutter having a peripheral series of helical teeth with cutting edges formed by the intersections between their end and side faces, the end face of each tooth being substantially in a single plane and being so disposed that certain of the spaces between the teeth are bounded on both sides by acute angle cutting edges.

6. A circular cutter for thread generation having a peripheral series of helical teeth with end cutting edges, the end face of each tooth being substantially an uninterrupted plane, and the planes of different teeth being so differently inclined to their respective helix angles that the edges flanking certain spaces between the teeth are both sharp angled cutting edges and occupy nearly the same plane perpendicular to the axis of the cutter.

7. A circular cutter for thread generation having an odd number of helical teeth in its periphery each formed with an acute angled cutting edge at one end and with the end face bounding such cutting edge being substantially an uninterrupted plane; the acute angled cutting edges of adjacent teeth being at relatively opposite sides, except as to the odd tooth, which is like the adjacent tooth at one side.

8. A circular generating cutter having a peripheral series of helical teeth, each bounded at one end by a single substantially continuous face at such an inclination to the helix angle of the tooth as to make an acute angled cutting edge by intersection with one of the side faces of the tooth; such acute angled edges of adjacent teeth in repeated alternation, facing toward one another and bounding the intermediate space, and all being substantially in the same plane.

9. A cutter as and for the purpose set forth having helical teeth with cutting edges at one end, said teeth being arranged in pairs with the cutting edges at the adjacent sides of the teeth of each pair formed by the intersections with such sides with end planes making acute angle respectively with the said adjacent sides, the opposite edges of said teeth being obtuse angled, and the teeth having a thickness less than the width of the grooves to be cut in the work so that the acute angled edges only engage the sides of a rib between two grooves or segments of grooves, and the opposite edges of the teeth are clear of the work.

In testimony whereof I have affixed my signature.

EDWARD W. MILLER.